(12) United States Patent  (10) Patent No.: US 7,407,201 B2
Pfertner et al.  (45) Date of Patent: Aug. 5, 2008

(54) COVER LOCKING DEVICE FOR A VEHICLE (75) Inventors: Kurt Pfertner, Ditzingen (DE); Detlev Ranft, Ettlingen (DE); Hartmut Popp, Köditz (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 247 days.

(21) Appl. No.: 11/203,114

(22) Filed: Aug. 15, 2005

(65) Prior Publication Data

US 2006/0061109 A1 Mar. 23, 2006

(30) Foreign Application Priority Data

Sep. 23, 2004 (DE) .................... 10 2004 046 098

(51) Int. Cl.
E05C 3/06 (2006.01)
B60J 7/00 (2006.01)
(52) U.S. Cl. .................... 292/201; 292/216; 292/280; 292/DIG. 5; 296/121
(58) Field of Classification Search ............ 292/201, 292/216, 279, 280, 15, 23, 144, 73, 193, 292/DIG. 5; 296/121
See application file for complete search history.

(56) References Cited

U.S. PATENT DOCUMENTS

| 4,651,594 | A | * | 3/1987 | Vogel et al. ............... 475/12 |
| 4,709,950 | A | * | 12/1987 | Zortman .................. 292/92 |
| 4,796,932 | A | * | 1/1989 | Tame ..................... 292/112 |
| 5,058,939 | A | * | 10/1991 | Miilu ..................... 292/110 |
| 5,735,557 | A | * | 4/1998 | Harvey .................... 292/216 |
| 5,772,274 | A | * | 6/1998 | Tokarz .................... 296/107.09 |
| 6,158,786 | A | | 12/2000 | Droste et al. |
| 6,520,560 | B2 | * | 2/2003 | Schutt et al. ............... 296/121 |
| 6,550,825 | B2 | * | 4/2003 | Ostrowski et al. .......... 292/199 |
| 6,676,556 | B2 | * | 1/2004 | Ishihara et al. ............. 475/269 |
| 6,932,414 | B2 | * | 8/2005 | Kustner et al. ............. 296/121 |
| 7,108,299 | B2 | * | 9/2006 | Homann et al. ............ 292/201 |
| 7,204,458 | B2 | * | 4/2007 | Porte et al. ............... 244/129.4 |

FOREIGN PATENT DOCUMENTS

| DE | 19721229 | 11/1998 |
| DE | 10300881 | 7/2004 |
| JP | 11334379 | 12/1999 |
| WO | WO 2004/067306 | 8/2004 |

OTHER PUBLICATIONS

European Search Report dated Aug. 30, 2005.

* cited by examiner

*Primary Examiner*—Carlos Lugo
(74) *Attorney, Agent, or Firm*—Crowell & Moring LLP (57) ABSTRACT A folding top clamp for a vehicle has a connecting-link-controlled locking hook which can be displaced by guiding devices from a closed position to an open position. The locking hook interacts with at least one hook guide which is in an operative connection with a motor gearing unit. A folding top clamp having a simple structure and a compact construction is provided in that the motor gearing unit extends only on a longitudinal side of the locking hook and has an electric motor oriented transversely with respect to a longitudinal center plane of the vehicle, which electric motor interacts by way of a triple-geared-down gearing unit with a hook guide of the locking hook.

17 Claims, 9 Drawing Sheets

COVER LOCKING DEVICE FOR A VEHICLE

BACKGROUND AND SUMMARY OF THE INVENTION

This application claims the priority of German Application No. 10 2004 046 098.1.0 filed Sep. 23, 2004, the disclosure of which is expressly incorporated by reference herein.

The invention relates to a folding top clamp for a vehicle having a connecting-link-controlled locking hook which can be displaced by means of guiding devices from a closed position to an open position, the locking hook interacting with at least one hook guide which is in an operative connection with a motor—gearing unit.

A folding top clamp of the initially mentioned type which functions well is known from German Patent Document DE 197 21 229 A1 corresponding in U.S. Pat. 6,158,786. In the case of this arrangement, a geared motor extending in the longitudinal direction of the vehicle is arranged on one side of the locking hook and is connected by way of a transversely extending transmission element with a gearing unit on the output side, which extends on the opposite side of the locking hook. The gearing unit is formed by a two-stage spur gear system.

It is an object of the invention to further develop a folding top clamp of the initially mentioned type such that it has a simplified structure and a more compact construction.

According to the invention, this object is achieved by providing a folding top clamp for a vehicle having a connecting-link-controlled locking hook which can be displaced by means of guiding devices from a closed position to an open position, the locking hook interacting with at least one hook guide which is in an operative connection with a motor gearing unit, wherein the motor gearing unit extends only on a longitudinal side of the locking hook and comprises an electric motor oriented transversely with respect to a longitudinal center plane of the vehicle, which electric motor interacts by way of a triple-geared-down gearing unit with a hook guide of the locking hook.

Important advantages achieved by means of the invention are that the motor gearing unit extending only on a longitudinal side of the locking hook has a simplified construction, in which case, as a result of the electric motor oriented transversely to the longitudinal center plane of the vehicle and the triple-geared-down gearing unit, a more compact construction is achieved. By means of the connecting-link-controlled locking hook and the special construction of the connecting link path, in addition, an enlarged fetching path of the folding top clamp is achieved in the X-direction. As a result of the arrangement of an emergency operating worm which, in the normal operation of the folding top clamp, fixes a ring gear of the planetary gearing, a relatively simple manual emergency operation for the folding top clamp is created. The combination of the bevel gearing, the worm gearing and the planetary gearing allows the representation of a relatively high overall ratio.

Other objects, advantages and novel features of the present invention will become apparent from the following detailed description of the invention when considered in conjunction with the accompanying drawings.

DETAILED DESCRIPTION OF THE DRAWINGS

A folding top clamp 1 is used for fixing a folding top of a convertible by means of a movable locking hook 2 on a receiving device 4 arranged on a windshield frame 3, the folding top clamp 1 being connected by means of screwing devices with a dimensionally stable forward folding top frame 5 of the folding top, which screwing devices are held in bores 6 of the folding top clamp 1.

The folding top clamp 1 comprises a basic carrier 7 fastened to the underside of the forward dimensionally stable folding top frame 5, a locking hook 2 which, in its closed position (latching position A shown in FIG. 3) is in an operative connection with the windshield frame 3 as well as a motor gearing unit 8 for moving the locking hook 2 from the closed position into the open position (unlatching position B shown in FIG. 4) and vice-versa. In the embodiment shown, a central electric-motor-driven folding top clamp 1 is provided by means of which the folding top of the convertible is pulled in the longitudinal direction of the passenger car against the windshield frame 3 and is held in the tensioned folding top position.

The basic carrier 7 formed, for example, by an aluminum diecast part, has bearing webs 9, 10, 11 for the fixing of the motor gearing unit 9 and for the bearing of hook guides 12, 13, which bearing webs 9, 10, 11 are arranged in a spaced manner, extend in the longitudinal direction of the vehicle and are vertically oriented.

Figure 3:
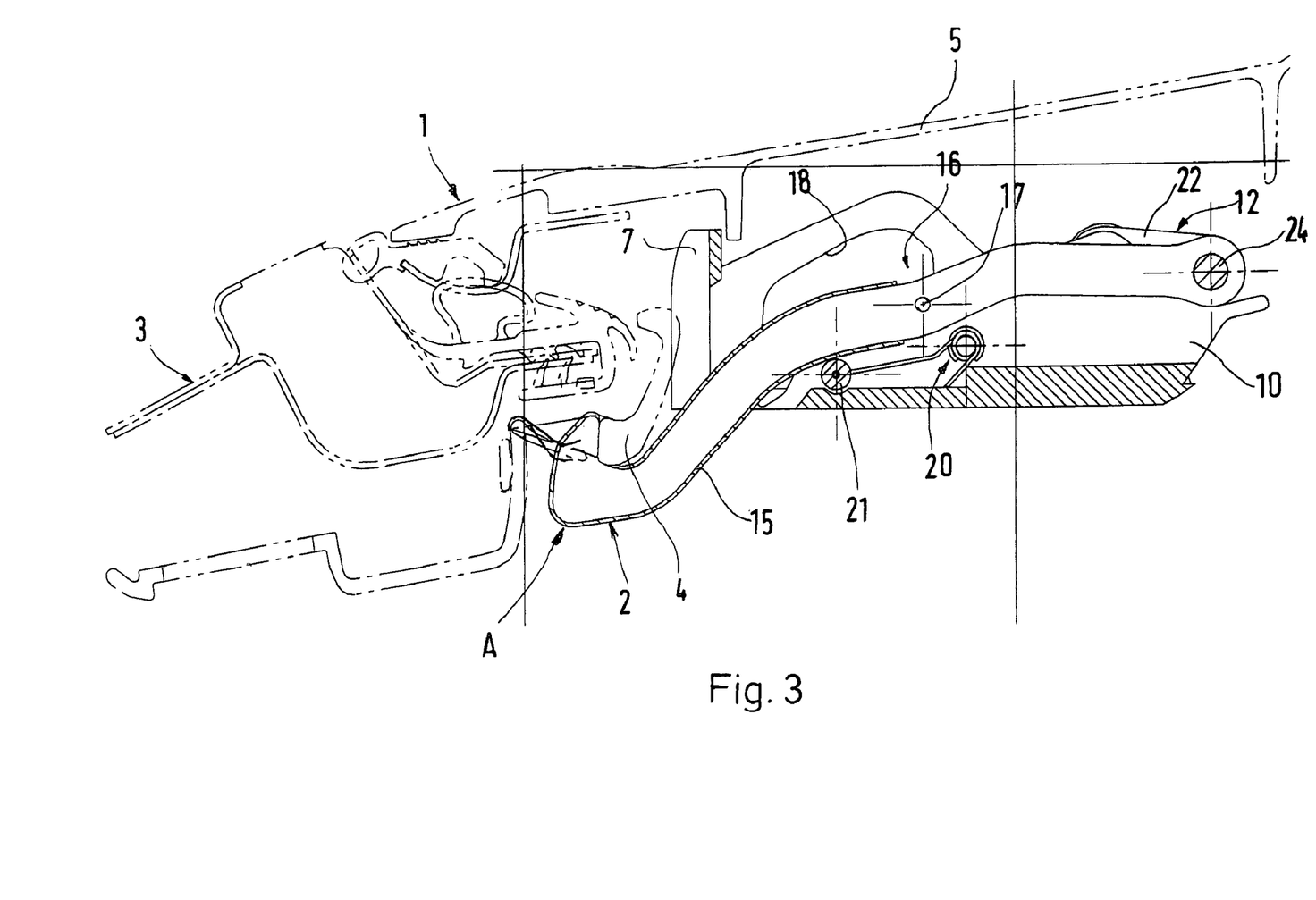
FIG. 3 is a sectional view taken along Line III-III and Line IV-IV of FIG. 2, showing the locking hook taking up a latched position.
Figure 4:
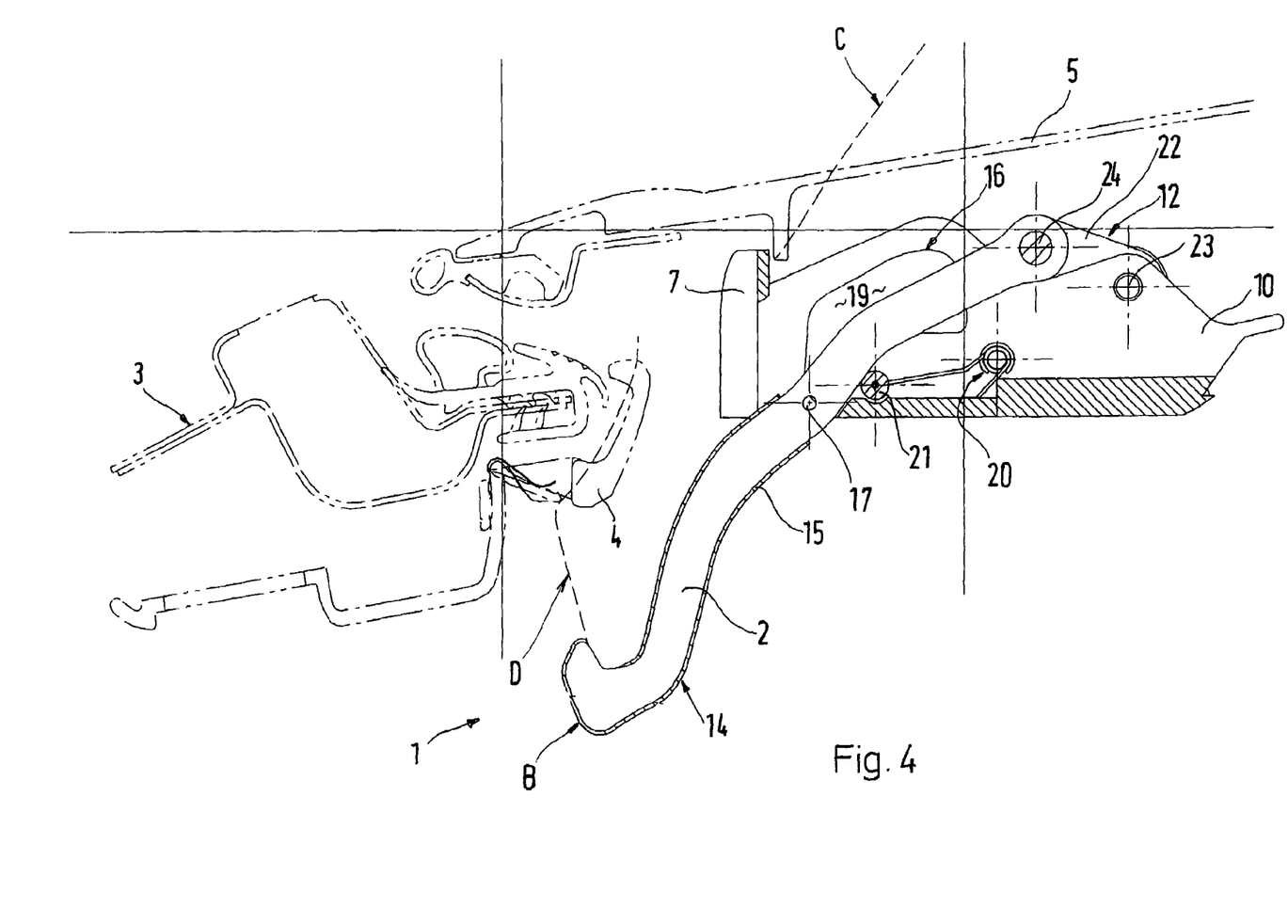
FIG. 4 is a sectional view similar to FIG. 3, showing the locking hook in the unlatched position.
Figure 5:
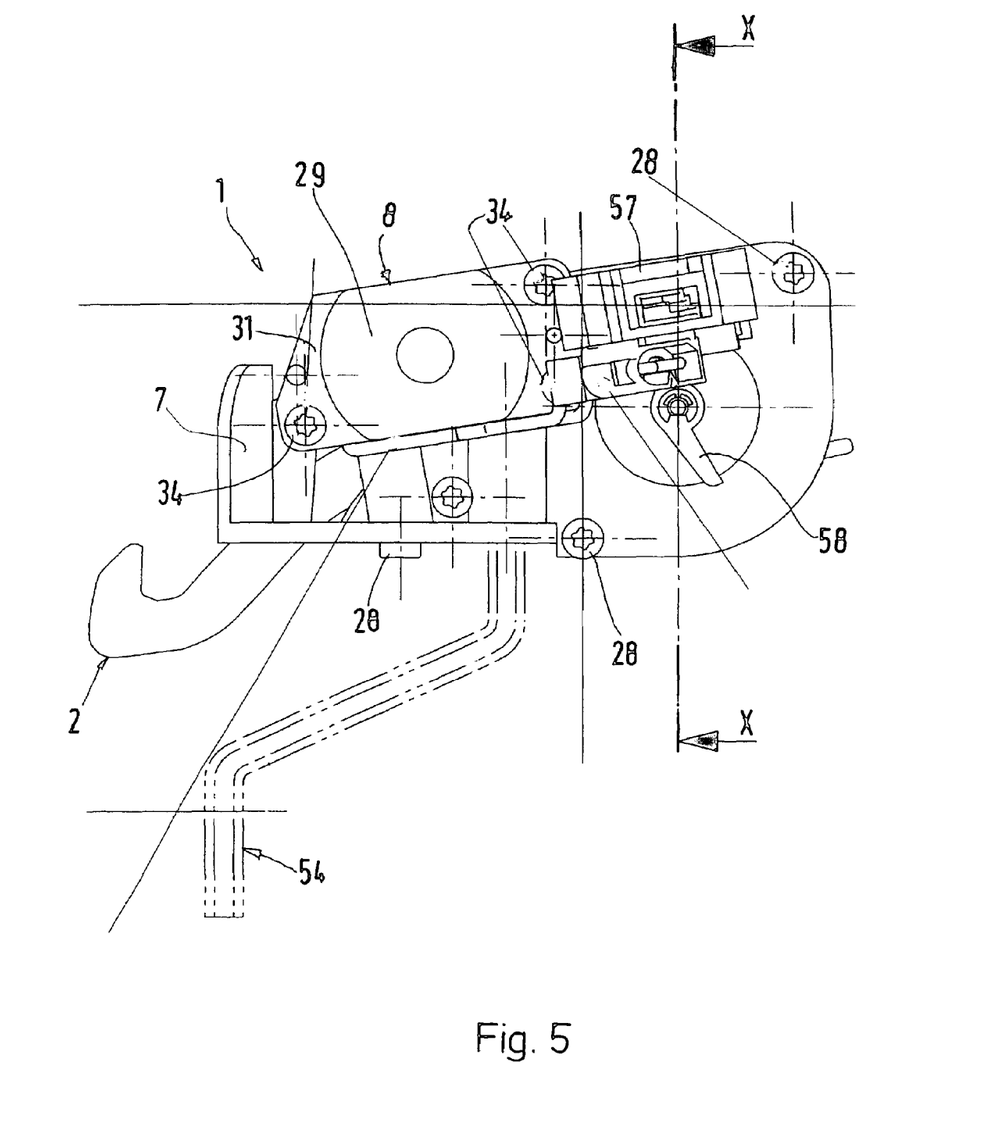
FIG. 5 is a view from the side of the folding top clamp, an emergency operating key being shown in a dash-dotted manner.
Figure 6:
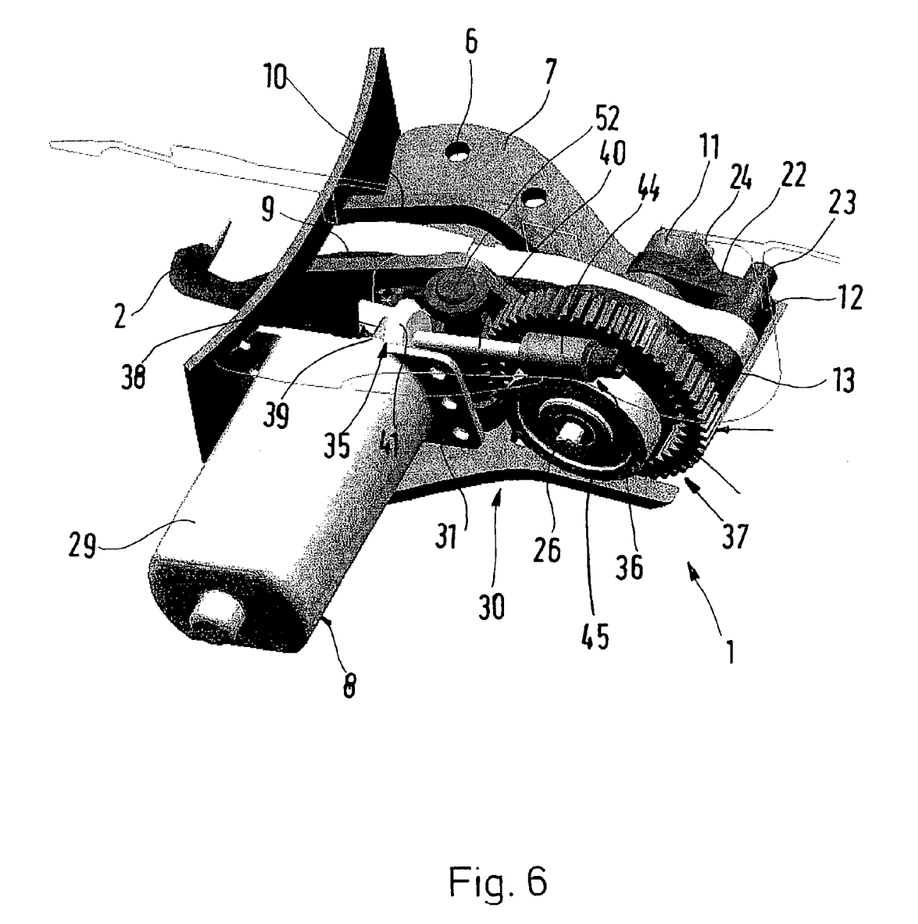
FIG. 6 is a perspective pictorial view diagonally from the rear of the folding top clamp, the motor gearing unit being shown in detail but without the gearbox.

In a forward area 14, the locking hook 2 is provided with a sprayed-around plastic arrangement 15, for example, made of POM (FIGS. 3 and 4). In a center area of its longitudinal dimension, a connecting link guide 16 for the locking hook 2 is provided, a laterally projecting spring-type pin 17 of the locking hook 2 interacting with at least one connecting link path 18 of the basic carrier 7. The connecting link path 18 composed of several joined-together path sections, according to FIGS. 3 and 4, is formed by the outer boundary of an opening 19 arranged at the bearing webs 9, 10. Depending on the constructive design of the connecting link path 18, the entering behavior of the locking hook 1 is influenced during the latching. The entering curves for the forward folding top section 5 and the forward end of the locking hook 2 are illustrated by a broken line in FIG. 4, the entering curve C being assigned to the folding top section 5, and the entering curve D being assigned to the locking hook 2.

The locking hook 2 received between the spaced bearing webs 9, 10 is pressed by means of a spring element 20 and a pressure roller 21 from below against the connecting link path 18. In the embodiment shown, the spring element 20 is formed by a double leg spring which is disposed on a transversely extending bolt of the basic carrier 7. The pressure roller 21 is disposed on a transversely extending top end of the double leg spring, which pressure roller 21 presses from below against the locking hook 2, whereby the laterally projecting spring-type pin 17 is pressed against the connecting link path 18.

The rearward end of the locking hook 2 interacts with at least one hook guide 12, 13. In the embodiment shown, two differently constructed hook guides 12, 13 are provided for the locking hook 2. The hook guide 12 facing away from the motor gearing unit 8 is formed by an oblong driving lever 22 which, at its one end, is connected by way of a transversely extending riveted pin 23 with the rearward end of the locking hook 2. The other, forward end of the driving lever 22 is rotatably connected with a joint pin 24 which, on one side, is received at the center bearing web 10 and, on the other side, is received at the outer bearing web 11. The driving lever 22 is placed in the space between the two bearing webs 10, 11. The hook guide 13 facing the motor gearing unit 8 has a disk-shaped contour and is connected in a force-transmitting manner by way of the joint riveted pin 23 with the rearward end of the locking hook 2 and by way of a polygon 25 (hexagon) with the bearing output shaft 26. By means of the motor gearing unit 8, the hook guide 12, 13 is swivelled by approximately 160° during the opening and closing operation of the folding top clamp 1, mechanical stops for both end positions being constructed on the basic carrier 7.

The motor gearing unit 8 is formed by a prefabricated module 27 which is placed from one side on an outer bearing web 9 of the basic carrier and is fastened to the latter by means of several screws 28.

According to the invention, the motor gearing unit 8 comprises an electric motor 29 which is oriented transversely to the longitudinal center plane E-E of the vehicle and interacts by way of a triple-geared-down gearing unit 30 with a hook guide 12, 13 for the locking hook 2. In the embodiment shown, viewed in the driving direction, the motor gearing unit 8 is provided on the left side on the basic carrier 7.

Figure 1:
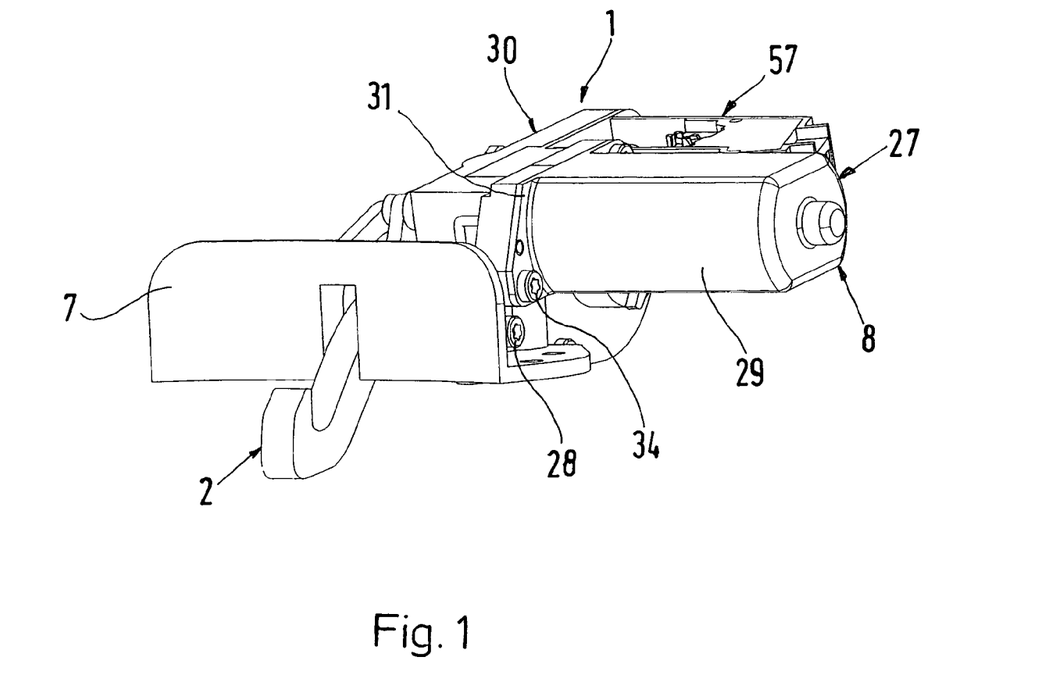
FIG. 1 is a perspective view diagonally from the front of a folding top clamp for a vehicle, constructed according to a preferred embodiment of the invention.
Figure 2:
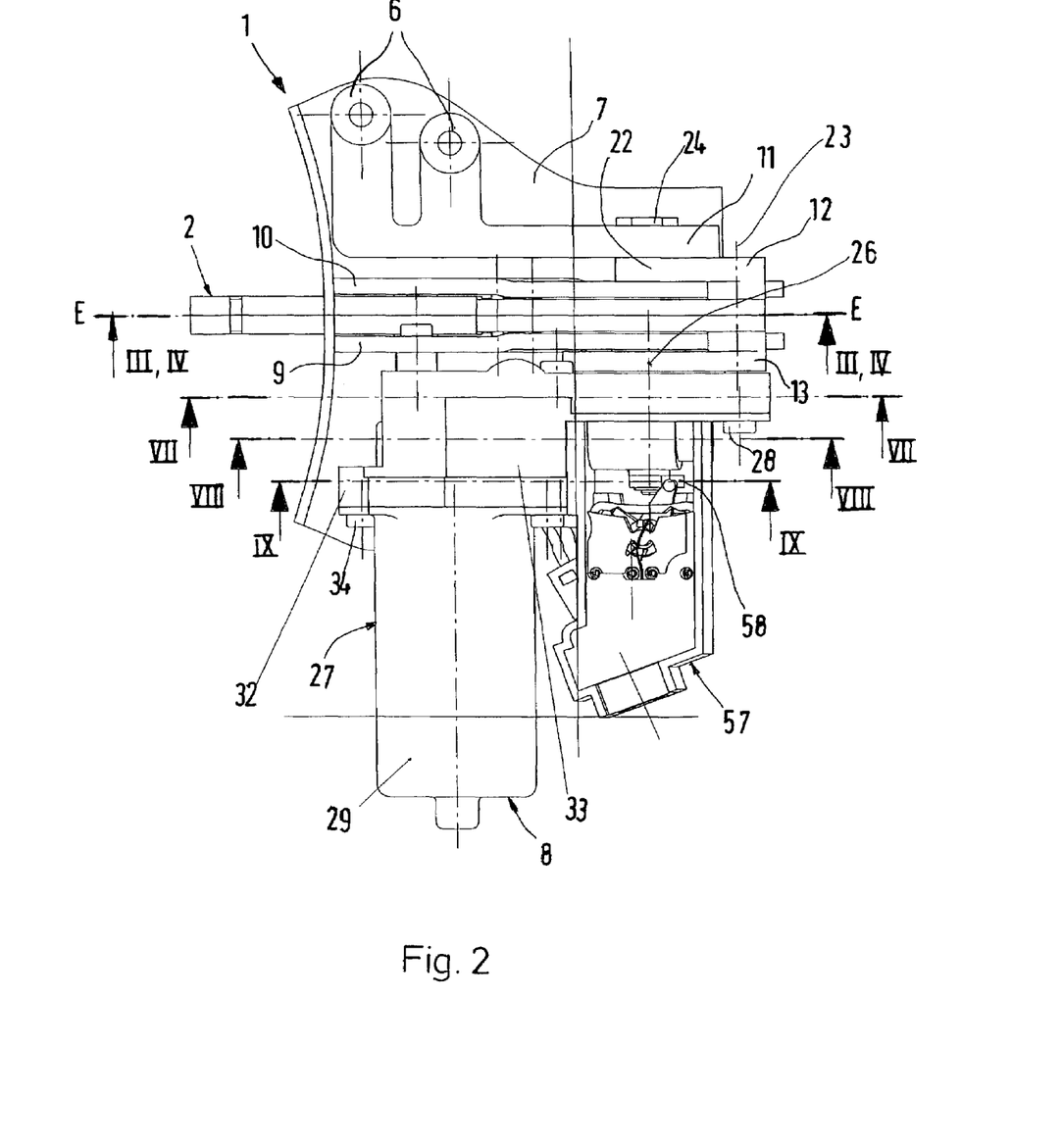
FIG. 2 is a top view of the folding top clamp of FIG. 1.

By way of a rectangular contact flange 31, the electric motor 29 is guided onto the exterior side of a multi-part gearbox 32, 33 and is fixedly connected with the latter by means of screws 34 (FIG. 1). The gearing unit 30 is composed of a bevel gearing 35, a worm gearing 36 connected therewith and a planetary gearing 37 connected on the output side, all gearings 35, 36, 37 being housed in the common multi-part gearbox 32, 33.

Figure 8:
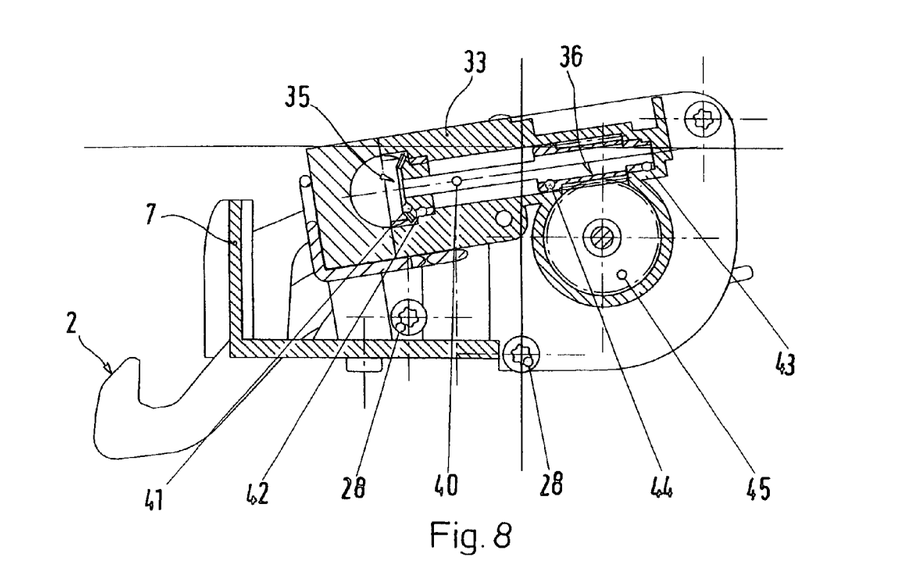
FIG. 8 is an enlarged sectional view taken along Line VIII-VIII of FIG. 2.
Figure 9:
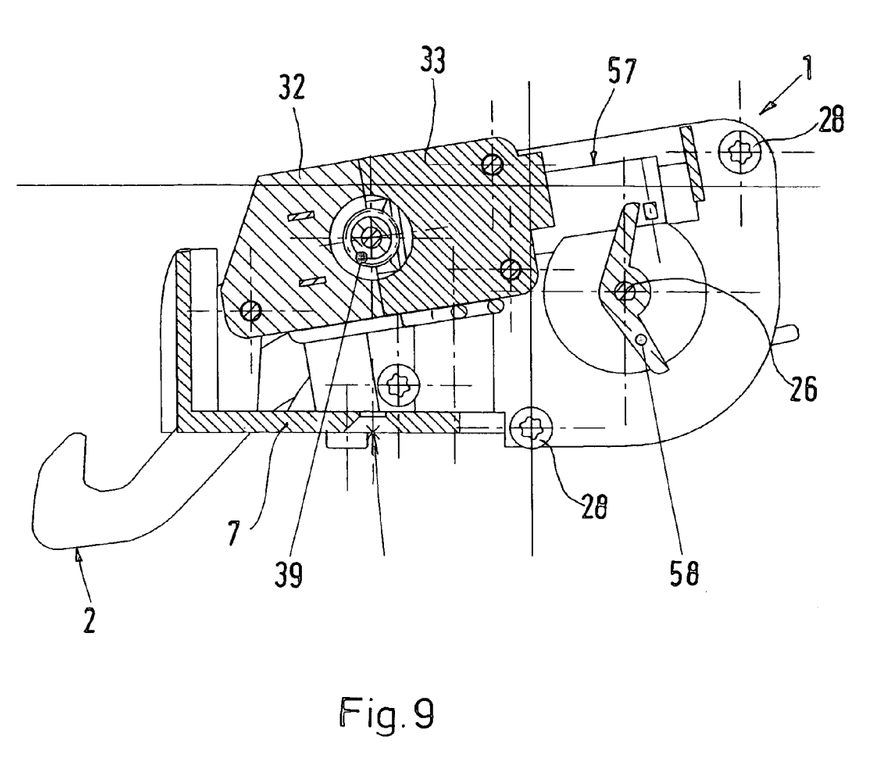
FIG. 9 is an enlarged sectional view taken along Line IX-IX of FIG. 2.
Figure 10:
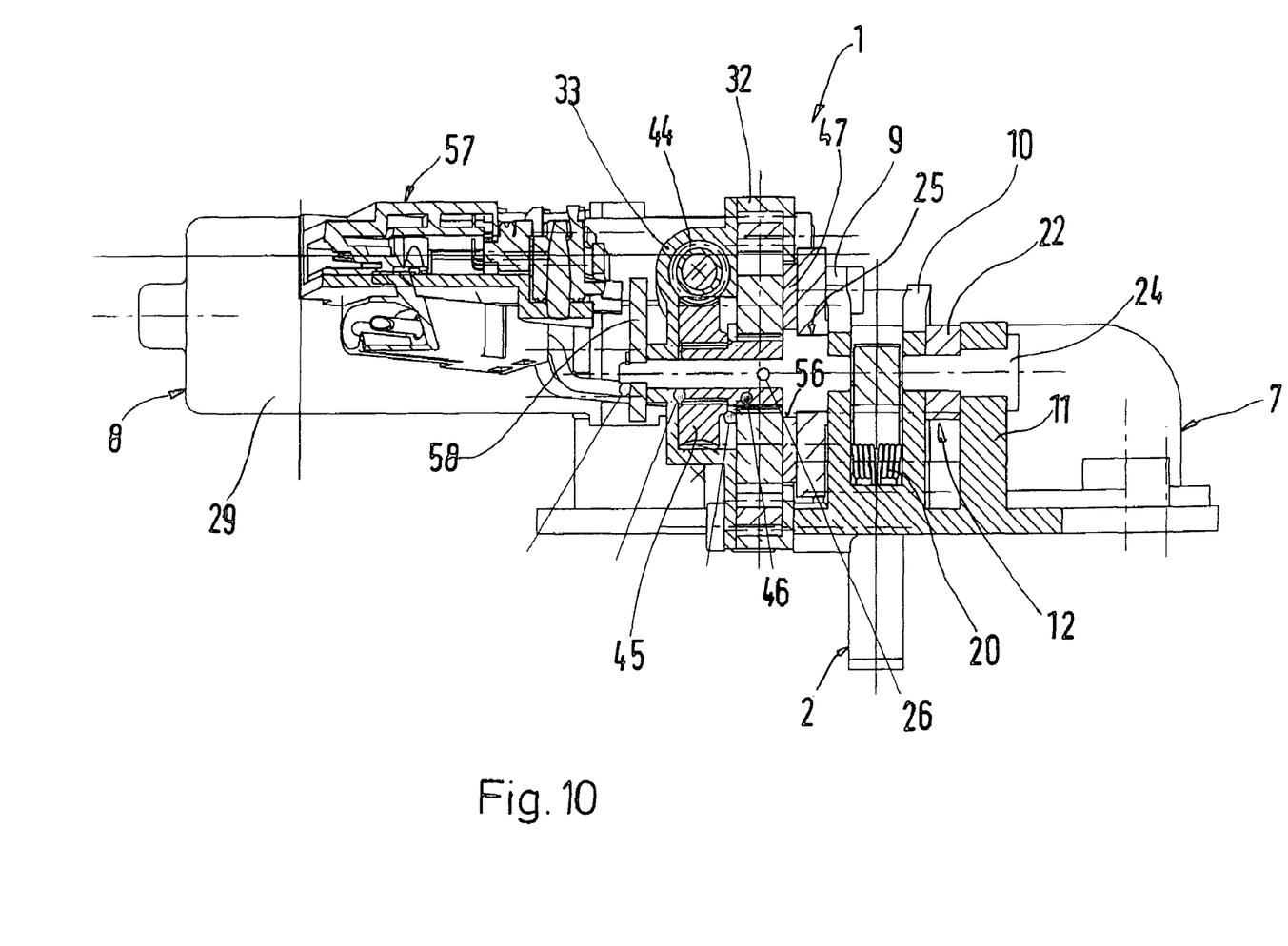
FIG. 10 is a sectional view taken along Line X-X of FIG. 5.

The bevel gearing 35 comprises a bevel drive pinion 39 arranged on an output shaft 38 of the electric motor 29 and an output bevel gear 41 shrunk onto a worm shaft 40, the bevel gear set causing a 90° deflection of the flux of force. The output shaft 38 of the electric motor 29 extends approximately at a right angle with respect to the longitudinal center plane E-E of the vehicle and is oriented approximately horizontally, whereas the worm shaft 40 extends parallel and at a distance from the longitudinal center plane E-E. In the longitudinal sectional view (FIG. 8), the worm shaft 40 rises slightly toward the rear. The worm shaft 40 is disposed in the gearbox 32, 33 by way of two non-rotatable bearings 42, 43. At the end of the worm shaft 40 opposite the output bevel gear 41, an oblong worm 44 is arranged which drives a worm gear 45 of the worm gearing 36 situated below.

The worm gear set transmits the torque to a sun gear 46 of the planetary gearing 37, the sun gear 46 being disposed in a freely rotating manner on the gearing output shaft 26. The worm gear 45 is fitted onto the sun gear 46 and is non-rotatably connected with it. The gearing output shaft 26 extending transversely with respect to the longitudinal center plane E-E of the vehicle is disposed at its one end in the gearbox 32, 33. The opposite end of the gearing output shaft 26 is rotatably disposed on the bearing web 9 of the basic carrier 7.

Figure 7:
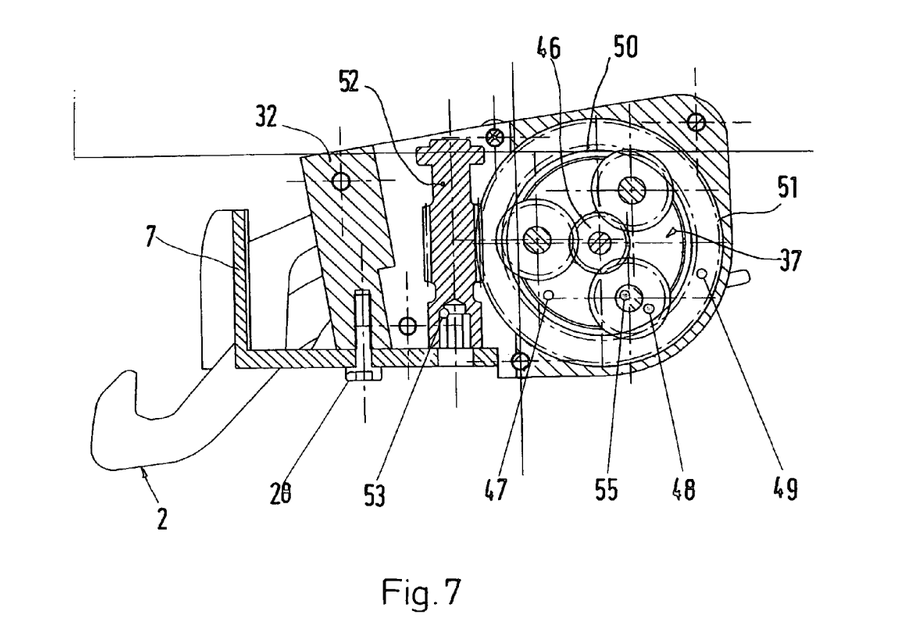
FIG. 7 is an enlarged sectional view taken along Line VII-VII of FIG. 2.

In addition to the sun gear 46, the planetary gearing 37 comprises several planet gears 48 rotatably disposed on a planet carrier 47 as well as an outer ring gear 49 (FIG. 7). The ring gear 49 has an internal toothing 50 and additionally an external toothing 51. In the normal operation of the folding top clamp 1, the ring gear 49 is stopped because the exterior toothing 51 of the ring gear 49 meshes with an emergency operating worm 52 arranged in an upright manner. The emergency operating worm 52 extends in the space between the output bevel gear 41 and the ring gear 49. The emergency operating worm 52 is disposed in the gearbox 32, 33 and, at its lower end facing the vehicle occupant compartment, has an internal polygon 53 into which an emergency operating key 54 bent at right angles can be fitted from the direction of the vehicle occupant compartment. In the embodiment shown, the emergency operating key 54 is snapped on the interior side in a covering of the basic carrier 7 which is not shown and which is placed from the direction of the vehicle occupant compartment onto the basic carrier 7.

The interior sun gear 46 drives the exterior planet gears 48, the planet gears 48 additionally meshing with the internal toothing 50 of the stationary ring gear 49. The planet gears 48 are each disposed on transversely extending needle rollers 55 of the planet carrier 47. The planet carrier 47 is disposed on a polygon 56 (such as a hexagon) of the gearing output shaft 26. Another polygon 25 (such as a hexagon) for the hook guide 13 is arranged directly next to the polygon for the planet carrier 47 on the gearing output shaft 26. The needle rollers 55 of the planet carrier 47 engage in the hook guide 13 and in the process transmit the torque to the hook guide 13. The latter is coupled by way of a polygon with the gearing output shaft 26. As a result, the gearing output shaft 26 rotates as fast as the hook guide 12, 13. As a result of a lever arm, the hook guide 12, 13 transmits the force to the locking hook 2.

The switching-off of the electric motor 29 and the inquiry as to whether the folding top clamp 1 has reached an end position is implemented by means of a switch module 57. The switch module 57 is disposed at the gearbox 32, 33. Microswitches for indicating the end position are controlled in the switch module 57 by way of a plate cam 58 which is non-rotatably fastened on the gearing output shaft 26 on the end side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. Folding top clamp for a vehicle comprising:
   a connecting-link-controlled locking hook extending in a direction along a vehicle longitudinal center plane, guiding devices associated with the locking hook for displacing the latter from a closed position to an open position, and at least one hook guide operatively connected with a motor gearing unit and the locking hook,
   wherein the motor gearing unit extends only on a longitudinal side of the locking hook and comprises an electric motor oriented transversely with respect to the vehicle longitudinal center plane and a triple-geared-down gear- ing unit provides an operative association of the electric motor with a hook guide of the locking hook, the gearing unit comprises a bevel gearing, a worm gearing connected with the bevel gearing, and a planetary gearing connected on an output side of the worm gearing, all gearings being accommodated in a common multi-part gearbox, the bevel gearing comprises a bevel drive pinion arranged on an output shaft of the electric motor and an output bevel gear shrunk onto a worm shaft of the worm gearing, and the bevel drive pinion and output bevel gear are configured to cause a 90° deflection of the flux of force.

2. Folding top clamp according to claim 1, wherein the worm shaft is supported in the gearbox by way of two non-rotatable bearings, and wherein a worm is arranged at an end of the worm shaft opposite the output bevel gear, which worm drives a worm gear of the worm gearing.

3. Folding top clamp according to claim 2, wherein the worm and worm gear of the worm gearing transmits torque to a sun gear of the planetary gearing which is disposed in a freely rotating manner on a gearing output shaft.

4. Folding top clamp according to claim 3, wherein a ring gear of the planetary gearing is stopped in a normal operation of the folding top clamp by means of an emergency operating worm.

5. Folding top clamp according to claim 1, wherein the output of the planetary gearing takes place by way of a planet carrier which transmits torque directly to the hook guide.

6. Folding top clamp according to claim 2, wherein the output of the planetary gearing takes place by way of a planet carrier which transmits torque directly to the hook guide.

7. Folding top clamp according to claim 3, wherein the output of the planetary gearing takes place by way of a planet carrier which transmits torque directly to the hook guide.

8. Folding top clamp according to claim 4, wherein the output of the planetary gearing takes place by way of a planet carrier which transmits torque directly to the hook guide.

9. Folding top clamp according to claim 3, wherein the hook guide is connected with the gearing output shaft by way of a polygon.

10. Folding top clamp according to claim 4, wherein the hook guide is connected with the gearing output shaft by way of a polygon.

11. Folding top clamp according to claim 1, wherein the hook guide is connected with the gearing output shaft by way of a polygon.

12. Folding top clamp according to claim 7, wherein the hook guide is connected with the gearing output shaft by way of a polygon.

13. Folding top clamp according to claim 8, wherein the hook guide is connected with the gearing output shaft by way of a polygon.

14. Folding top clamp according to claim 1, wherein the connecting-link-controlled locking hook is pressed by way of a double leg spring and a pressure roller from below against a connecting link path.

15. Folding top clamp according to claim 2, wherein the connecting-link-controlled locking hook is pressed by way of a double leg spring and a pressure roller from below against a connecting link path.

16. Folding top clamp according to claim 3, wherein the connecting-link-controlled locking hook is pressed by way of a double leg spring and a pressure roller from below against a connecting link path.

17. Folding top clamp according to claim 9, wherein the connecting-link-controlled locking hook is pressed by way of a double leg spring and a pressure roller from below against a connecting link path.

* * * * *